(12) United States Patent
Rasheed (10) Patent No.: US 10,289,880 B2
(45) Date of Patent: May 14, 2019

(54) AUGMENTED REALITY MEMORIAL

(71) Applicant: Nizar Rasheed, Norwood (AU)

(72) Inventor: Nizar Rasheed, Norwood (AU)

(73) Assignee: Nizar Rasheed, Norwood (AU)

( * ) Notice: Subject to any disclaimer, the term of this patent is extended or adjusted under 35 U.S.C. 154(b) by 0 days.

(21) Appl. No.: 15/556,825

(22) PCT Filed: Mar. 8, 2016

(86) PCT No.: PCT/AU2016/050161
§ 371 (c)(1),
(2) Date: Sep. 8, 2017

(87) PCT Pub. No.: WO2016/141429
PCT Pub. Date: Sep. 15, 2016

(65) Prior Publication Data
US 2018/0053021 A1    Feb. 22, 2018

(30) Foreign Application Priority Data

Mar. 9, 2015 (AU) ................................ 2015900831

(51) Int. Cl.
*G06K 7/10* (2006.01)
*G06T 19/00* (2011.01)
(Continued)

(52) U.S. Cl.
CPC ....... *G06K 7/10297* (2013.01); *E04H 13/001* (2013.01); *G06K 7/1413* (2013.01); *G06K 7/1417* (2013.01); *G06T 19/006* (2013.01)

(58) Field of Classification Search
CPC ............. G06K 7/10297; G06K 7/1413; G06K 7/1417; E04H 13/001; G06T 19/006
(Continued)

(56) References Cited

U.S. PATENT DOCUMENTS

2011/0047893 A1    3/2011  Iezza
2011/0134108 A1*   6/2011  Hertenstein ........... G06T 19/006
                                                                345/419
(Continued)

FOREIGN PATENT DOCUMENTS

DE       102011106791 A1    1/2013
EP           3211603 A1      8/2017
(Continued)

OTHER PUBLICATIONS

Carmigniani, J., et al., "Augmented reality technologies, systems and applications," Multimedia Tools Appl. 2011;51:341-377.
(Continued)

*Primary Examiner* — Paultep Savusdiphol
(74) *Attorney, Agent, or Firm* — Kenealy Vaidya LLP (57) ABSTRACT

Some embodiments are directed to information systems, assemblies and funerary markers employing augmented reality for the commemoration of deceased individuals. Mobile devices are employed to decode digital tags that locate commemorative content, to map the position and geometry of a headstone, and to display the commemorative content in semantic context with the headstone. A spatial mapping module and augmented reality engine adapt the commemorative content for displaying the content in alignment with the position and geometry of the headstone.

28 Claims, 5 Drawing Sheets

(51) Int. Cl.
*E04H 13/00* (2006.01)
*G06K 7/14* (2006.01)

(58) Field of Classification Search
USPC .............................. 235/375, 462.01, 462.09
See application file for complete search history.

(56) References Cited

U.S. PATENT DOCUMENTS

| | | | | |
|---|---|---|---|---|
| 2012/0327117 | A1* | 12/2012 | Weller .................. | G06T 19/006 345/633 |
| 2013/0155106 | A1* | 6/2013 | Rolleston .............. | G06T 19/006 345/633 |
| 2013/0281207 | A1* | 10/2013 | Lyons ................. | G07F 17/3211 463/33 |
| 2014/0139519 | A1* | 5/2014 | Mit ......................... | G06T 17/05 345/419 |
| 2014/0210947 | A1* | 7/2014 | Finn ..................... | G01C 15/002 348/46 |
| 2014/0285519 | A1 | 9/2014 | Uusitalo et al. | |
| 2017/0331924 | A1* | 11/2017 | Katori .................... | H04L 67/38 |

FOREIGN PATENT DOCUMENTS

| | | |
|---|---|---|
| KR | 10-2012-0051139 A | 5/2012 |
| KR | 10-2012-0077780 A | 7/2012 |

OTHER PUBLICATIONS

Jackson, C., "Cemeteries Come to Life with Augmented Reality Gravestones" [retrieved from Internet on Apr. 28, 2016] <URL: http://web.archive.org/web/20150306044126/http://www.augmentedrealitytrends.com/augmented-reality/gravestones.html> published on Mar. 6, 2015 as per Wayback Machine.
Korah, T., et al., "Mobile Augmented Reality at the Hollywood Walk of Fame," Virtual Reality Conference (VR), IEEE, pp. 183-186, Mar. 2011.
Vincent, T., et al., "Classifying handheld Augmented Reality: Three categories linked by spatial mappings," Workshop on Classifying the AR Presentation Space at ISMAR, Nov. 2012, pp. 1-6.
May 6, 2016 Search Report issued in International Application No. PCT/AU2016/050161.
May 6, 2016 Written Opinion issued in International Application No. PCT/AU2016/050161.
Oct. 10, 2018 European Search Report issued in European Patent Application No. EP16760932.

* cited by examiner

AUGMENTED REALITY MEMORIAL

CROSS REFERENCE TO RELATED APPLICATION(S)

This is a national phase filing under 35 C.F.R. § 371 of and claims priority to PCT Patent Application No. PCT/AU2016/050161, filed on Mar. 8, 2016, which claims the priority benefit under 35 U.S.C. § 119 of Australian Patent Application No 2015900831, filed on Mar. 9, 2015, the contents of each of which are hereby incorporated in their entireties by reference.

BACKGROUND

Some embodiments generally relate to digital commemorative experiences. More particularly, some embodiments relate to information systems for augmented reality commemoration at a site of a funerary marker, to augmented reality memorial assemblies, and to funerary markers for an augmented reality commemoration of one or more deceased individuals.

For many years, across many cultures, it has been customary to mark the final resting place or a tributary place of a deceased person with a commemorative plaque, headstone or stele in memory of the deceased.

It has been a long standing custom that physical markers of this kind are inscribed with basic details of the deceased person such as their name and their date of birth and death, together with a brief personal message or prayer. These texts and other funerary art or decoration that often adorns the funerary marker are usually permanently carved in relief or painted on wood.

In recent times, particularly in European cultures, it has also become customary to incorporate a photograph of the deceased within or on the headstone. Beyond this minor adaptation enabled with the advent of photography, very little has changed in the last millennium with the way that deceased persons are remembered or commemorated 'at the graveside'.

SUMMARY

However, with recent advances in technology, those experiencing the death or loss of a loved one will often seek out recordings from the deceased's life such as video footage of the deceased, still images of the deceased and audio of the deceased's voice. These forms of media offer significant comfort particularly through the grieving process, by triggering very real, tangible memories of the deceased.

Forms of media able to capture the emotion experienced in connection with the deceased provide loved ones with a more emotive grieving or remembrance experience. In many cases this will also allow a quicker and healthier passage of bereaved persons through the grieving process, and provide them with a richer remembrance experience.

Today, for many people experiencing the death of a loved one, grieving and remembrance experiences involve a combination of commemoration at the site of the physical funerary marker as well as personal reflection involving the viewing of video footage, audio, still images and other personal artefacts from the deceased's life. To date, almost all attempts to bring the two together by bringing video, audio, image collections or other personal artefacts to the site of the physical funerary marker (in digital or other forms) have failed to satisfactorily enhance the 'graveside' commemorative experience.

In some instances, difficulties arise in reaching a balance between providing sufficient personal depth of information to effectively enhance the graveside commemoration experience, while protecting deeply personal information from public viewing by all site visitors. However, for bereaved persons seeking to give more information about the deceased, digital options have encountered problems integrating displays and audio devices at the site of the physical funerary marker due to the weathering and degradation of components over time.

Recently, the ubiquity of mobile devices has led to many more home videos, audio streams and still images being digitally captured and virtually stored on social media sites and the like. In addition, recently developed smart devices provide a suitable platform for content visualisation. Some embodiments implement some or all of these advances to address or overcome some of the issues addressed above.

In a first broad form, some embodiments relate to an information system for augmented reality commemoration at a site of a funerary marker including:
  one or more items of digital content for commemorating at least one deceased individual, the one or more items of digital content each being located at one or more unique network locations,
  one or more digital tag(s) encoding said network location(s);
  a spatial mapping module for mapping the position and geometry of the funerary marker;
  an augmented reality engine for receiving information from the spatial mapping module and adapting the one or more items of digital content to align with the position and/or geometry of the funerary marker; and
  a display that displays the adapted digital content in semantic context with the funerary marker.

As used herein, the term "augmented reality" and any pluralisations and derivatives thereof is defined as including any form of technology creating a state of affairs whereby the physical world, or any discreet object within the physical world, is viewed in combination with overlayed or rendered digital information. This includes, but is not limited to, forms of augmented reality whereby actual events are viewed in combination with digital information via a display screen (in real time or on past recordings of actual events), spatial augmented reality whereby digital information is rendered onto the physical world via projectors, and visualisation via other wearable technology that may not utilise screen or projector displays. This includes the viewing of moving or static physical objects overlayed or rendered with moving or static digital information.

As used herein, the term "funerary marker" and any pluralisations and derivatives thereof are defined as including any physical sign or indicator used for the commemoration of one or more deceased individuals. Funerary markers may therefore include, but are not limited to, urns, plaques, tombs, statues and steles (particularly headstones and war memorial pickets). Funerary markers are not to be construed as limited to those for the commemoration of deceased humans, and may include markers for the commemoration of other deceased beings, in particular deceased pets.

In some embodiments, the one or more items of digital content for commemorating the at least one deceased individual, the spatial mapping module and/or the augmented reality engine may be stored on at least one non-transitory computer readable storage medium. Optionally, the at least one non-transitory computer readable storage medium may be provided by a mobile device.

Furthermore, the at least one non-transitory computer readable storage medium may be cloud hosted. For example, information relating to the position and/or geometry of the funerary marker may be received and transmitted to a spatial mapping module which is cloud hosted. Furthermore, the augmented reality engine may be hosted on the same or a different cloud, wherein the spatial map generated by the spatial mapping module, and the one or more items of digital content may be transmitted to the augmented reality engine to adapt the one or more items of digital content to align with the position and/or geometry of the funerary marker.

Thus, in some embodiments, the non-transitory computer readable storage medium may be accessed via a mobile device.

Some embodiments digital content may include movies, archives, family trees, ancestry information, links to social media pages and/or ancestry pages, or digital tribute pages. More preferably, digital content may include memorial information as described elsewhere herein.

In some embodiments, the digital tag is provided at the site of the funerary marker. Preferred tags include digitally decipherable optical and radio tags, such as barcodes, QR codes, RFID tags, NFC tags and the like.

In another embodiment, the network location may be a location on an internal network. Optionally, the network location may also be a closed network. Alternatively, the network location may be located on the World Wide Web. Further, the network location may host a tributary archive, a social media page, or an ancestry archive.

In a further form of the system, the information for commemorating the one or more deceased individuals may be protected by preselected privacy settings. In addition, the network location containing information for commemorating the one or more deceased individuals may be encrypted. Furthermore, the network location may be password protected.

Some display devices according to some embodiments may include any one of a number of visualisation displays including portable or stationary monitors or screens, capacitive or static screens, mobile or fixed displays, projector or micro-projector displays, wearable visualisation displays not including screens or projectors, and other wearable displays, just to name a few. Suitable displays according to the invention will be known to one of ordinary skill in the art.

In certain information systems according to some embodiments, the display may be provided by a mobile device.

Information relating to the type of display employed (its hardware and software components) may be communicated to the augmented reality engine. Thus, the engine may also customise the adapted digital content to the type of display employed. For example, digital content adapted for mobile display may be adapted in a different way form display via projection.

In a second broad form, some embodiments relate to an augmented reality memorial assembly including;
 a code reader for decoding a Uniform Resource Identifier (URI) identifying memorial information on a network,
 a visual receiver in communication with a spatial mapping module for mapping the position and geometry of a funerary marker,
 an augmented reality engine for receiving information from the spatial mapping module and adapting the memorial information to align with the position and/or geometry of the funerary marker,
 at least one processor for executing the spatial mapping module and the augmented reality engine,
 at least one memory, and
 a visualisation display for displaying the adapted memorial information in semantic context with the funerary marker.

As used herein, the term "code reader" and any pluralisations and derivatives thereof is defined as including any means for digitally deciphering a code. It includes, but is not limited to, optical and radiofrequency digital receivers such as simple optical cameras, high resolution image sensors, Bluetooth devices and the like. It may also include a means for deciphering a written code such as a URL or a web address. A code reader may be deployed to decipher optically distinguishable codes such as barcodes and QR codes, or RFID tags, NFC tags and the like.

In some embodiments, the augmented reality memorial assembly includes a funerary marker and a coded tag capable of decoding by the code reader. The coded tag may be affixed to the funerary marker or formed integrally with the funerary marker.

Some tags may be embossed or printed on suitable materials, such as metals, metal alloys, synthetic materials, timber or composite materials. Materials able to withstand natural degradation and weathering are preferred. Further, materials providing a simple, aesthetically pleasing mode of affixing to the funerary marker are also preferred. Tags may be formed from stainless steel, and/or precious or semi-precious metals such as gold, silver, titanium, copper and alloys thereof. Alternatively, tags may be printed by commonly available printing technology or may even be stenciled by hand.

An alternative to affixing the tag to an existing funerary marker, may be to affix the tag to the funerary marker prior to installation. Alternatively, the tag may be etched or painted into a funerary marker yet to be erected. A preferred combined funerary marker and tag is weatherproof.

Memorial information may include any form of digital content. Preferably it includes information such as movies, audio, still images, text and/or games (e.g. geocaching games or educational games), such as home movies or voice recordings particularly of the deceased or their loved ones, musical compositions such as compositions prepared or enjoyed by the deceased or their loved ones, photographs or artistic works prepared by, commissioned for or enjoyed by the deceased or their loved ones, or text such as poems or other literary works authored by or enjoyed by the deceased or their loved ones. In another form, the memorial information may include one or more games authored by, invented by or enjoyed by the deceased, their loved ones or their followers.

Digital memorial information may be hosted on a network at a location identifiable by a Uniform Resource Identifier (URI). The network may include an internal or private network, and may use a private IP address space which may not comply with conventional internet protocol standards. Internal or private networks may include home, office or enterprise local area networks, virtual private networks or virtual private LAN services. Digital memorial information may alternatively be hosted on a public or external network, which preferably complies with conventional internet protocol standards.

Digital memorial information may be hosted on closed networks which do not interface with other entities such as the World Wide Web, backend systems or third party partners and service providers. Alternatively, digital memorial information may be closed to one or more entities selected from the group including; the World Wide Web, backend systems, and/or third party entities such as partners and service providers (e.g. private intranets or private clouds). Further, digital memorial information may be hosted on open networks, such as networks capable of interfacing with the World Wide Web, backend systems, and third party entities such as partners and service providers.

As used herein, the term "Uniform Resource Identifier" or "URI" and any pluralisations and derivatives thereof is defined as any string of characters used to identify a name or location of a resource including a file, a database or another computer. The term includes, but is not limited to, any full or absolute path identifying a location of a resource on a network, a URL which follows the appropriate naming convention, and/or an IP address.

The visual receiver can be an input device. It can receive and input visual information relating to the funerary marker and its surrounding environment, particularly the position and geometry of the marker. The visual receiver may also receive and input other signals, such as geolocation data and other digitally encoded information such as information encoded in QR codes, barcodes or RFID tags.

The visual receiver and the code reader may, optionally, be the same device. Preferably, the visual receiver is an optical device, further preferably, the visual receiver is an optical scanning and input device. More preferably still, the code reader and visual receiver include a single optical scanning and input device, such as a digital camera.

In other embodiments, the code reader and the visual receiver may include an optical camera. Further, the visual receiver may include an optical camera and the code reader may include a radio frequency receiver. Even further, the visualisation display may be a display screen, or alternatively an in-built projector.

Further, the visual receiver may, optionally, include one or more high resolution image sensors.

The visual receiver may convert visual information to digital information. More preferably, the digital information is in compressed format, for example MPEG-2 Part 2, MPEG-4 Part 2, H.264 (MPEG-4 Part 10), HEVC, Theora, Dirac, RealVideo RV40, VP8, VP9, AVI, MP4, FLV, RealMedia, or Matroska. Optionally, visual information may be processed by video compression algorithms or codecs.

The visual receiver is optionally in one-way communication with a spatial mapping module. Communications include the transfer of digital information from the visual receiver to the spatial mapping module. The digital information is in the form of spatial data. Spatial data may include spatial information relating to the funerary marker or spatial information relating to the surrounding environment.

The spatial mapping module may receive digital information from the visual receiver. The spatial mapping module may process the digital information to generate a spatial map. The spatial map may provide contextual information of the relative position and geometry of objects captured by the visual receiver within their environment. The objects captured by the visual receiver may include the funerary marker. The spatial map may provide the relative position and geometry of the funerary marker in its environment with respect to the position of the visual receiver.

The spatial mapping module may include publicly availably spatial mapping tools such as MadMapper and VPT 6.0, or VPT 7.0.

In an alternative form, the spatial mapping module additionally receives information from the code reader, accesses a network location identified by the URI, and pushes the memorial information located at the network location across the network. The memorial information may be received by the augmented reality engine.

The following steps may occur sequentially; the spatial mapping module is executed in response to visual receiver inputs (or vice versa), memorial information is localised and accessed or downloaded from the network location, and the augmented reality engine is initiated. This procedure, preferably, provides greater processing efficiency and/or a time delay.

In an alternative form, the augmented reality engine receives information from the code reader, accesses a network location identified by the URI, and pulls the memorial information located at the network location across the network. The memorial information may also be received by the augmented reality engine.

The following steps may occur concurrently; in response to code reader inputs the augmented reality engine localises and accesses or downloads the memorial information from the network location, and the spatial mapping module is executed in response to visual receiver inputs. This procedure, may provide greater time efficiency and/or a loss of processing capacity.

The spatial mapping module, may relay a spatial map of the funerary marker, in the context of its environment, to the augmented reality engine. The spatial map may also provide information relating to the position of the visual receiver.

The augmented reality engine, may use the spatial map to processes the memorial information to adapt the memorial information to align with the position and/or geometry of the funerary marker and/or its environment. Optionally, adaptation includes, but is not limited to, conversion of the memorial information to a three dimensional representation of the information, conversion of the memorial information to information that compensates for undulations (and the like) in the funerary marker and/or its environment, conversion of the memorial information to information that imparts additional meaning within the context of the funerary marker and/or its environment.

Some augmented reality engines may include, but may not be limited to, Wikitude, Qualcom Vufouria, Aurasma, D'Fusion, Metaio and the like.

Information on the type of visualisation displays employed in the assembly is relayed to the augmented reality engine. In a further form, adaptation of the memorial information may be customised for the type of visualisation display.

In another form, the spatial mapping module and the augmented reality engine may include one or more discrete application software components. A combined spatial mapping module and augmented reality engine may include MadMapper, VPT 6.0, VPT 7.0, Wikitude, Qualcom Vufouria, Aurasma, D'Fusion, Metaio etc.

Adapted memorial information may be transferred from the augmented reality engine to the visualisation display. Some forms of communication and/or information transfer include internet enabled transfer, transfer over Wi-Fi, transfer via Bluetooth, transfer via data cables or transfer via a non-transitory computer readable storage medium.

Some forms of visualisation displays include display screens, for example, tablet screens, smartphone screens or other smart device screens. Fixed screens, such as traditional computer screens (LED, LCD or others), may also be utilised. Alternative displays may include wearable displays not including screens or projectors but alternative visual display capabilities. Suitable wearable displays will be known to one of ordinary skill in the art.

In alternative forms, projector based visualisation displays are utilised. They may include nano or micro projectors, optionally, built into a smart device or connected to a device via a USB cable or Bluetooth connection. Examples include Samsung Galaxy Beam, the LG eXpo Projector Phone, and the NTT DoCoMo F-04B Projector Phone.

Alternatively, projector based visualisation displays may include a separate video projector device. Separate video projector devices may be fixed at the site of the funerary marker and/or housed within a weatherproof casing.

A visualisation display may include a combination optical camera and projector or screen.

In alternative forms, the augmented reality memorial assembly may be contained wholly or partially on a smart device.

In a third broad form, some embodiments relate to a funerary marker for an augmented reality commemoration of one or more deceased individuals including;
   a coded tag encoding a Uniform Resource Identifier (URI), whereby the URI is directed to a network location containing information for commemorating the one or more deceased individuals; and
   a visualisation display for displaying the information for commemorating the one or more deceased individuals in semantic context with the funerary marker.

As used herein, the term "in semantic context" and any pluralisations and derivatives thereof is used to describe a quality of the graphic outputs displayed via a visualisation display, whereby information is displayed in a way that it is graphically meaningful with respect to a physical object and/or its surrounding environment. Semantic context may be created, for example, by converting information to a three dimensional representation of that information, converting information to a variation of that information that compensates for undulations (and the like) on a physical object and/or its environment, converting information to a variation of that information that imparts additional meaning within the context of a physical object and/or its environment. Semantic context may also be dependent on the type of display in which the graphic output is displayed.

In one form, the funerary marker may be further used with a code reader, and a receiver in communication with a spatial mapping module and an augmented reality engine, to retrieve, process and display the information for commemorating the one or more deceased individuals in semantic context with the funerary marker.

In an alternative form, the funerary marker may be further used with an augmented reality memorial assembly according to second aspect.

In a further alternative form, the funerary marker may be used with an information system according to the first aspect.

In another form, the visual receiver may be located within a mobile device. Further, the spatial mapping module and the augmented reality engine may include one or more discrete application software components. Additionally, the spatial mapping module and the augmented reality engine may also be located within a mobile device.

In alternative forms, the visualisation display may include a projector display. The visualisation display may also be located within a mobile device.

Some embodiments now will be described with reference to the accompanying drawings together with the examples and the preferred embodiments disclosed in the detailed description. The invention may be embodied in many different forms and should not be construed as limited to the embodiments described herein. These embodiments are provided by way of illustration only such that this disclosure will be thorough, complete and will convey the full scope and breadth of the invention.

DESCRIPTION OF EMBODIMENTS

Several embodiments are described in the following examples.

EXAMPLES

Figure 1:
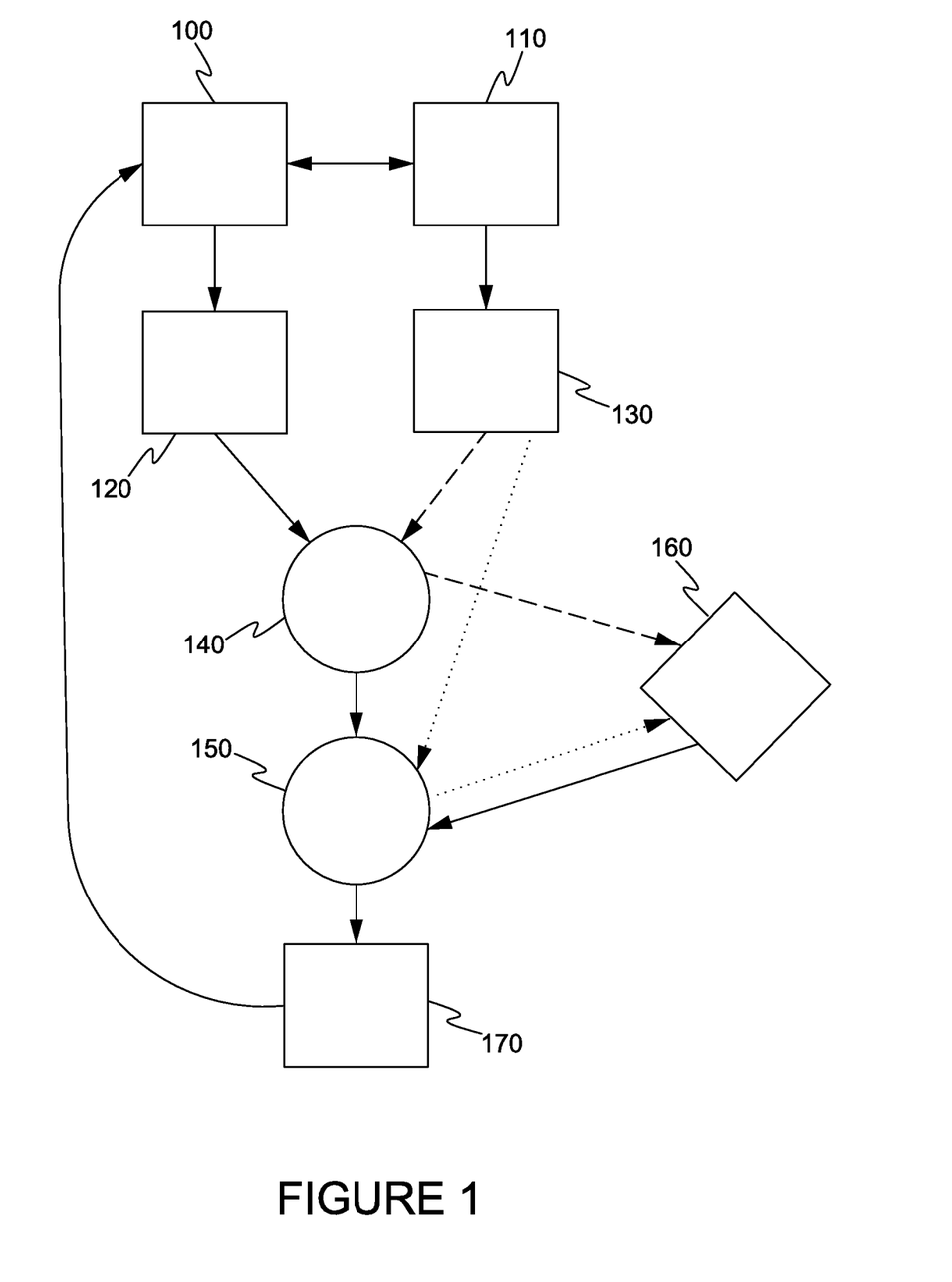
FIG. 1 is a schematic of a high level schematic representation of various information systems, assemblies and funerary markers according to the invention.

FIG. 1 is a high level schematic representation of various information systems, assemblies and funerary markers according to the invention and describes the general processing and information flows across various embodiments, including those illustrated in the Examples.

A funerary marker is shown at 100 which may be a stele, headstone, plaque or urn. A coded tag 110, specific to the funerary marker, is associated with the funerary marker either by being engraved or etched onto the marker or placed upon or near the marker. The funerary marker and coded tag are associated with one or more deceased individuals.

The visual receiver 120 acts as an input device and receives visual information relating to the funerary marker, particularly the position and geometry of the marker. This information is relayed to the spatial mapping module 140. The decoder 130 also acts as an input device by decoding a Uniform Resource Locator (URL) from the coded tag 110. The network location provided by the URL is relayed to either the spatial mapping module 140 or the augmented reality engine 150.

In the former, the spatial mapping module 140 locates the content 160 hosted at the network location to push the content to the augmented reality engine 150. A sequence follows whereby the spatial mapping module is executed in response to visual receiver inputs, followed by localisation and downloading of content prior to initiation of the augmented reality engine. This procedure, indicated in broken lines, creates greater processing efficiency at the expense of a time delay.

Whereas in the latter, the augmented reality engine locates the content 160 hosted at the network location and retrieves the content directly. This allows for the concurrent processing of the spatial map in response to the visual receiver input, and content retrieval by the augmented reality engine. This procedure, indicated by dotted lines, creates greater time efficiency at the expense of requiring greater processing capacity.

The spatial mapping module 140 relays a spatial map to the augmented reality engine 150 to provide semantic context of the surrounding environment, particularly the position and geometry of the funerary marker, to the augmented reality engine 150.

The augmented reality engine 150 processes the retrieved content 160 to adjust the content for visually meaningful visualisation via the display 170, over or near the funerary marker 100. The display 170 may overlay content upon the funerary marker to be visualised via a screen display. Alternatively, the display 170 may render content upon or adjacent to the funerary marker via a projector display.

Figure 2:
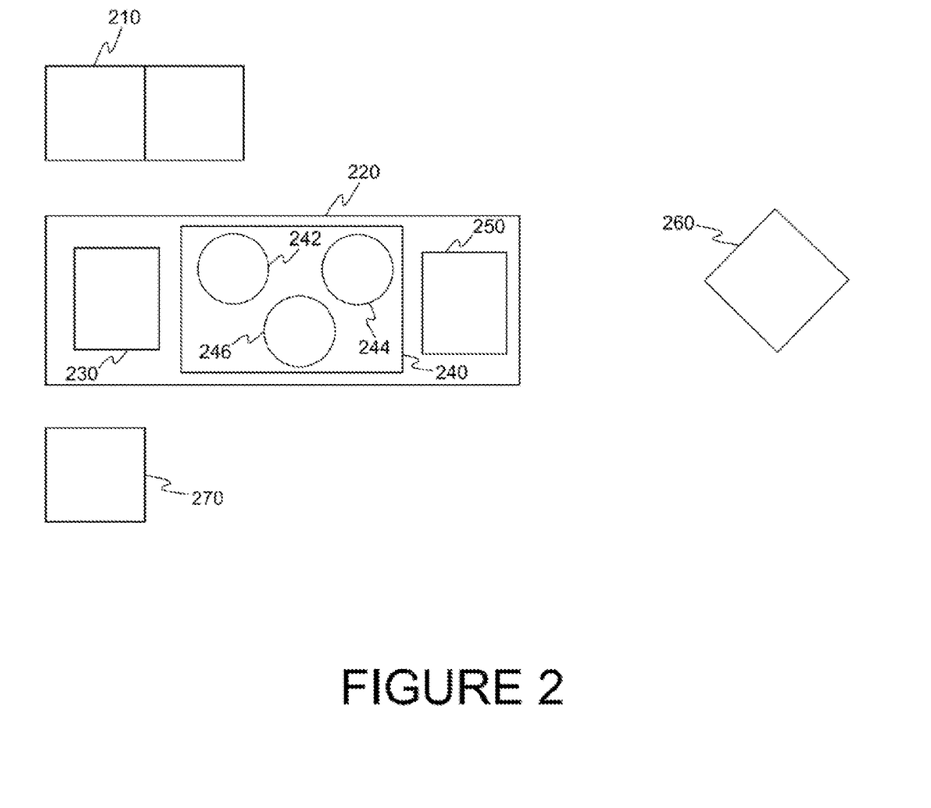
FIG. 2 is a schematic representation of information flows for embodiments of the invention involving smart devices.

FIG. 2 is a schematic representation of information flows of various information systems, assemblies and funerary markers according to the invention for embodiments of the invention involving smart devices. Embodiments according to FIG. 2 offer simplicity of installation and ease of operation. The combined funerary marker and coded tag 210 is formed by affixing a coded tag upon the face of a funerary marker.

Smart device 220 provides the necessary hardware to perform the functions of the visual receiver, the decoder, and the display and enables content retrieval from a network.

These functions are provided by the optical camera 230, screen display 250 and networking hardware (not shown) to enable the localisation and retrieval of hosted content 260. Many off the shelf smart devices also contain Bluetooth technology which provides flexibility in the type of coded tag that can be employed. The optical camera will allow for the scanning of QR codes and barcodes whereas a Bluetooth device will allow for the scanning of RFID tags. Some smart devices, such as projector phones, contain built-in projector displays which can be used as an alternative display to the traditional screen display. The networking capabilities of the smart device 220 are used to download software applications including a decoder executable 242, a spatial mapping module 244 and an augmented reality engine 246, which are then also housed within the smart device 220.

By installing software applications according to some embodiments, the smart device 220 is configured to allow a visitor to the site of the funerary marker to launch the augmented reality software package 240, scan the funerary marker and coded tag 210 (in a single motion or two motions depending on the quality of the optical camera utilised), retrieve the desired content relating to the deceased and align the camera with the funerary marker such that the content 260 and funerary marker can be viewed together via the screen display as an digital overlay upon the physical funerary marker 270.

Example 1

Figure 3:
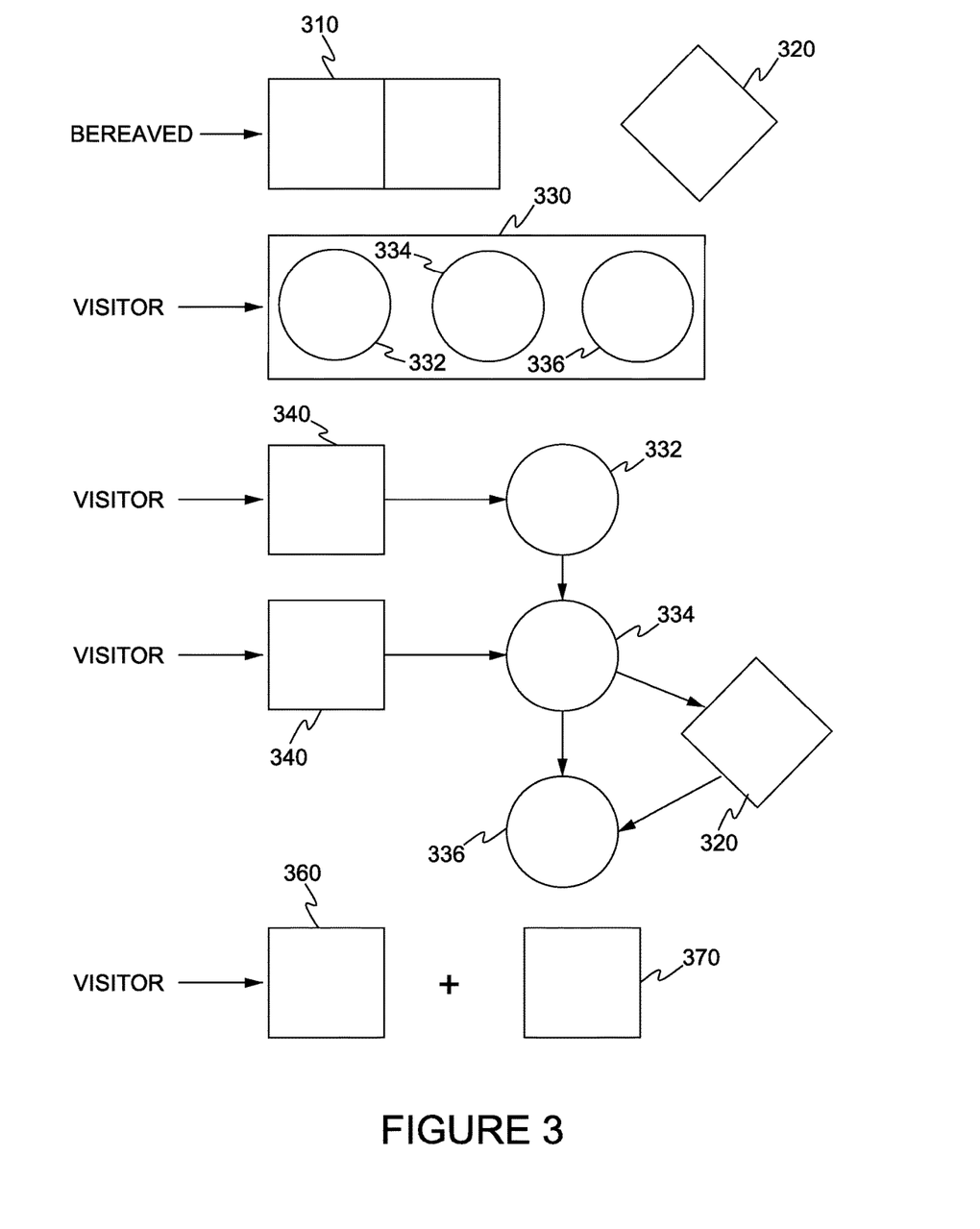
FIG. 3 is a process flow chart for an augmented reality headstone using a smartphone to initiate and visualise commemorative content via the phone's screen display.

FIG. 3 is a process flow chart for an augmented reality headstone using a smartphone to initiate and visualise commemorative content via the phone's screen display. In this Example a smartphone may be readily substituted with a web-enabled tablet or similar device.

Upon request by the bereaved, a QR code is embossed on a stainless steel plate and affixed to the face of an existing headstone, or affixed to a new headstone yet to be erected. The combined headstone and QR code 310 can therefore identify a unique web-hosted network location 320 when scanned.

The bereaved also uploads commemorative videos, audio, still images or text messages, such as poems and other personal works, to a tributary archive in commemoration of the deceased. The archive is located at the unique network location 320 and can be accessed by scanning and decoding the QR code 310 to provide the URL for the unique network location 320. The tributary archive can equally be accessed off-site by manually entering the URL into a web browser. The hosting provider for the tributary archive is able to provide the bereaved with the option of password protecting and/or encrypting part or all of the archive to restrict access to sensitive and personal information.

For the recently bereaved, support services to carry out this process are provided by the supplier of the tributary archive services in concert with the funeral director. For many modern funerals, digital displays are prepared for the service which can be uploaded to unique network location 320 with minimal fuss to the bereaved. Additionally, the fixing of the stainless steel plate can be coordinated with the funeral director prior to erecting the headstone, again, to minimise fuss to the bereaved.

For circumstances in which the funerary ceremony has already passed, the bereaved may employ the services of the tributary archive supplier to prepare the tributary site and manufacture and retrofit the installation of the stainless steel plate.

Once installed, a visitor to the headstone can download decoder 332, spatial mapping module 334 and augmented reality engine 336 on-site at the cemetery or prior to visiting the headstone. The three software applications are downloaded as a single software package 330, but once installed they are unpacked and configured to interface in the following manner.

At the site of the headstone, the visitor launches the augmented reality software package 330 which initiates the smartphone optical camera 340. By scanning the QR code, decoder 332 decodes the URL identifying unique network location 320. In the same or a separate gesture depending on the quality of the smartphone camera, the visitor scans the headstone; activating spatial mapping module 334. Spatial mapping module 334 generates a spatial map of the headstone and its surrounding environment, particularly the geometry and position of the headstone. This information is relayed to augmented reality engine 336. Spatial mapping module 334 uses the URL to locate the unique network location 320 hosting the tributary content, in turn and pushes the content to augmented reality engine 336.

The augmented reality engine 336 processes the tributary content and alters the content to provide a visually meaningful visualisation of the tributary content over the headstone via the smartphone camera 340 and smartphone display 360. The tributary content is also contextualised with respect to the headstone environment such that the combined view of the headstone and the overlayed content 370 is collectively meaningful. Aurasma (HP Autonomy) provides a suitable spatial mapping module and augmented reality engine for contextualising written and graphical tributary content rendered upon a headstone.

Example 2

Figure 4:
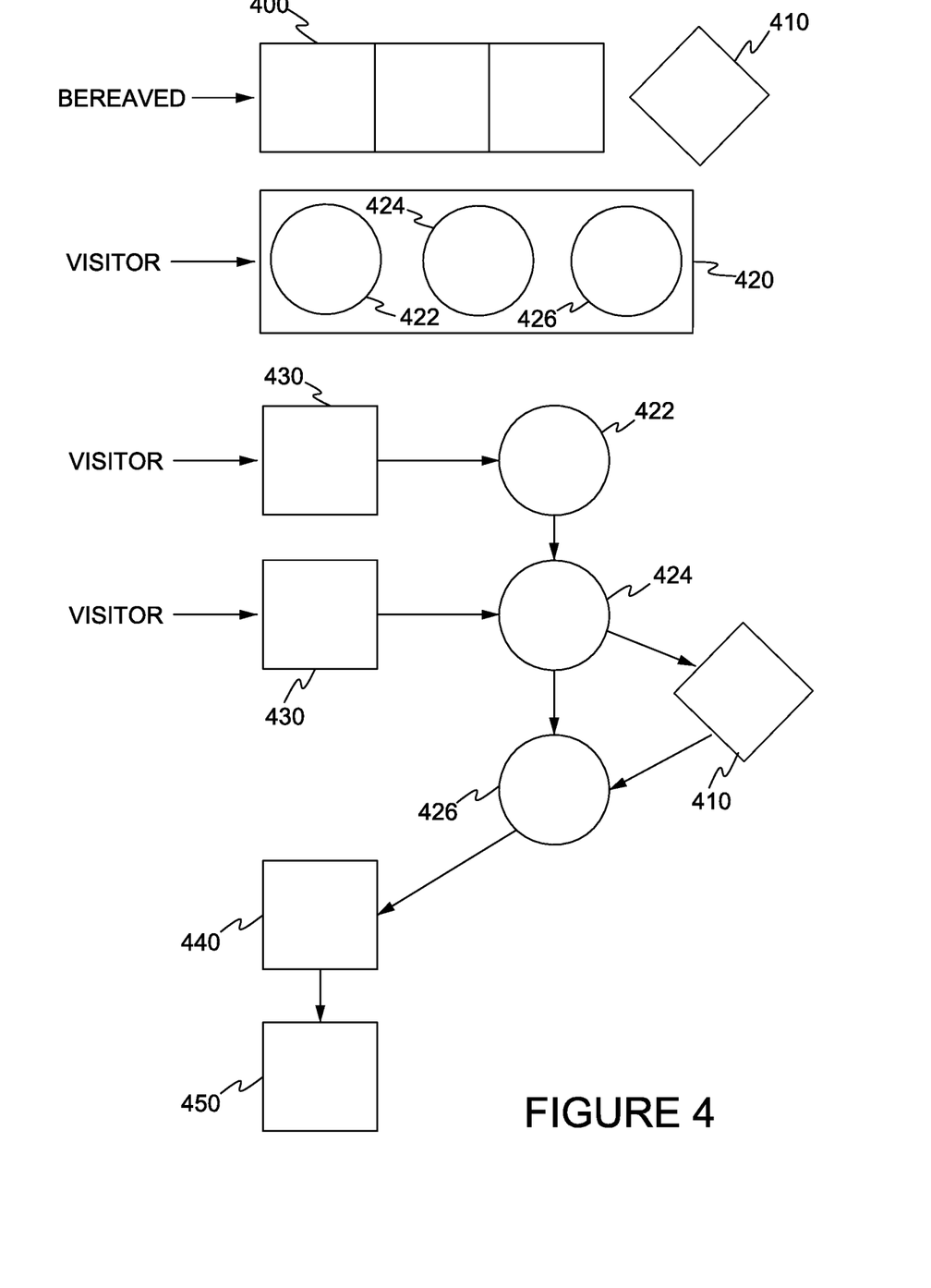
FIG. 4 is a process flow chart for an embodiment of the invention utilising a projector phone.

FIG. 4 illustrates the information flows for an embodiment of the invention utilising a projector phone. At the request of the bereaved, a unique web-hosted network location 410 is prepared with uploaded commemorative videos, audio, still images or text messages, such as poems and other personal works, to a tributary archive as described in Example 1. A combination headstone and stainless steel embossed QR code is also prepared as described in Example 1, however a smartphone mount is also provided in combination with the headstone and QR code. The smartphone mount is affixed to the face of the headstone to provide a combined headstone, QR code and smartphone mount assembly 400, however it is also envisaged that the mount may be affixed to the ground or in other proximal locations to the headstone, depending on the intensity of the smartphone's micro projector.

A visitor to the headstone downloads decoder 422, spatial mapping module 424 and augmented reality engine 426 and launches the augmented reality software package 420 as described in Example 1. The visitor scans the QR code using optical camera 430 such that decoder 422 reveals the URL identifying unique network location 410.

The visitor must then place the phone in the smartphone mount prior to scanning the headstone with optical camera 430. Spatial mapping module 424 is activated as described in Example 1 with further processing and information flows between spatial mapping module 424, network location 410, and augmented reality engine 426 as per those described in Example 1.

The augmented reality engine 426, however, processes and alters the tributary content hosted at network location 410 to provide a visually meaningful three dimensional visualisation of the tributary content over the headstone via the projector phone projector 440. The tributary content is also contextualised with respect to the headstone environment such that the combined view of the headstone and the rendered content 450 is collectively meaningful.

The Example 2 embodiment may provide particular advantages for the elderly or infirm who may experience difficulty holding a smart device in hand for extended periods of time. In addition, projector based visualisations may provide a suitable alternative for visitors who wish to share their commemorative or remembrance experience together or with loved ones or friends.

Example 3

Figure 5:
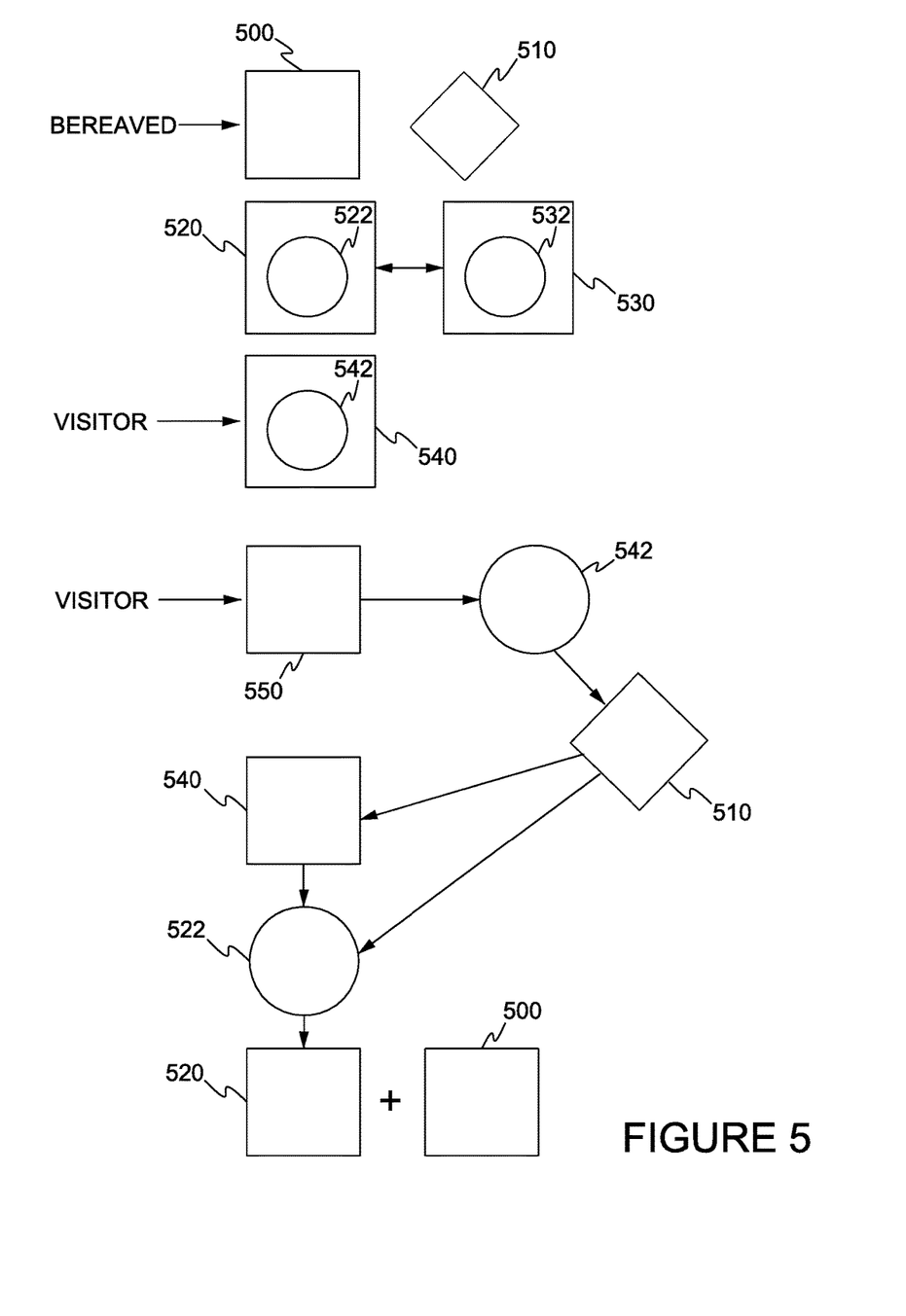
FIG. 5 is a process flow chart for an embodiment of the invention utilising a fixed projector.

FIG. 5 illustrates the information flows for an embodiment of the invention utilising a fixed projector. At the request of the bereaved, a unique web-hosted network location 510 is prepared with uploaded commemorative videos, audio, still images or text messages, such as poems and other personal works, to a tributary archive as described in Examples 1 and 2. A combined headstone and stainless steel embossed QR code 500 is also prepared as described in Examples 1 and 2.

Fixed projector 520 housing augmented reality engine 522 is affixed to the base of the headstone, however it is also envisaged that the projector may be affixed to the ground or in other proximal locations to the headstone, depending on the intensity of the projector.

Smart camera 530, with spatial mapping module 532 installed thereon, is placed beside projector 520 to generate a spatial map of the headstone and its surrounding environment, particularly the geometry and position of the headstone. This information is relayed to augmented reality engine 522 via a data cable. For Bluetooth enabled projectors, data transfer may also be provided wirelessly via a Bluetooth connection.

A visitor to the headstone downloads decoder 542 to their smartphone 540 prior to arriving at the cemetery or while they are visiting. The visitor scans the QR code using optical camera 550 such that decoder 542 reveals the URL identifying unique network location 510 and retrieves the content at network location 510 for temporary storage on smartphone 540. The content is transferred to the augmented reality engine 522 housed within projector 520 via a data cable. For Bluetooth or Wi-Fi enabled projectors data may also be transferred wirelessly.

The augmented reality engine 522 processes and alters the tributary content hosted at network location 510 to provide a visually meaningful three dimensional visualisation of the tributary content over the headstone 500 via the projector 520. The tributary content is also contextualised with respect to the headstone environment such that the combined view of the headstone and the rendered content is collectively meaningful.

Advantages offered by the Example 3 embodiment of the invention may be apparent to those skilled in the art, particularly the advantages arising from the ability to use greater intensity projectors to provide a full spatial augmented reality overlay on the headstone or surrounding environment. In addition, efficiencies are realised through the need to only perform a single spatial mapping of the headstone for all visitors and the need to use only the basic functions of a smartphone which may vary in sophistication from visitor to visitor, as much of the hardware is built into the headstone assembly.

Throughout this specification and the word "include," or variations such as "includes," or "including," and "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for some embodiments. It is not to be taken as an admission that any or all of these matters form part of the prior art base or were common general knowledge in the field relevant to some embodiments as it existed in Australia or elsewhere before the priority date of each claim of this application.

While the invention has been described above in terms of specific embodiments, it is to be understood that the invention is not limited to these disclosed embodiments. Upon reading the teachings of this disclosure many modifications and other embodiments of the invention will come to the mind of those skilled in the art to which this invention pertains, and which are intended to be and are covered by both this disclosure and the appended claims.

It is indeed intended that the scope of the invention should be determined by proper interpretation and construction of the appended claims and their legal equivalents, as understood by those skilled in the art relying upon the disclosure in this specification and the attached figures.

The invention claimed is:

1. An information system for augmented reality commemoration at a site of a funerary marker, comprising:
   one or more items of graphic digital content for commemorating at least one deceased individual, the one or more items of graphic digital content each being located at one or more unique network locations;
   one or more digital tag(s) encoding the network location(s);
   a spatial mapping module for mapping the position and geometry of the funerary marker wherein the spatial mapping module is configured to receive a visual representation of the funerary marker and to generate a spatial map including the position and geometry of the funerary marker, and wherein the spatial mapping module is configured to communicate the spatial map to an augmented reality engine;
   an augmented reality engine configured to receive a spatial map from the spatial mapping module and information of the type of display included in the system, and configured to adapting the one or more items of graphic digital content to align with the position and/or geometry of the funerary marker; and a display for displaying a graphic output including the adapted graphic digital content in semantic context with the funerary marker as a visual overlay of the graphic output.

2. The information system according to claim 1, wherein the digital tag is provided at the site of the funerary marker.

3. The information system according to claim 1, wherein the one or more items of graphic digital content for commemorating the at least one deceased individual, the spatial mapping module and/or the augmented reality engine are stored on at least one non-transitory computer readable storage medium.

4. The information system according to claim 3, wherein the at least one non-transitory computer readable storage medium is provided by a mobile device.

5. The information system according to claim 3, wherein the at least one non-transitory computer readable storage medium is cloud hosted.

6. The information system according to claim 5, wherein the non-transitory computer readable storage medium is accessed via a mobile device.

7. The information system according to claim 1, wherein the network location is a location on an internal network.

8. The information system according to claim 1, wherein the network location is on a closed network.

9. The information system according to claim 1, wherein the network location is located on the World Wide Web.

10. The information system according to claim 1, wherein the network location hosts a tributary archive, a social media page or an ancestry archive.

11. The information system according to claim 1, wherein the information for commemorating the at least one deceased individual is protected by preselected privacy settings.

12. The information system according claim 11, wherein the network location containing information for commemorating the one or more deceased individuals is encrypted.

13. The information system according to claim 1, wherein the display is provided by a mobile device.

14. An augmented reality memorial assembly, comprising;
  a code reader for decoding a Uniform Resource Identifier (URI) identifying graphic memorial information on a network;
  a visual receiver in communication with a spatial mapping module for mapping the position and geometry of a funerary marker wherein the spatial mapping module is configured to receive a visual representation of the funerary marker and to generate a spatial map including the position and geometry of the funerary marker, and wherein the spatial mapping module is configured to relay the spatial map to an augmented reality engine;
  an augmented reality engine configured to receive a spatial map from the spatial mapping module and information of the type of display included in the system, and configured to adapting the graphic memorial information to align with the position and/or geometry of the funerary marker;
  at least one processor for executing the spatial mapping module and the augmented reality engine;
  at least one memory; and
  a visualisation display for displaying a graphic output including the adapted graphic memorial information in semantic context with the funerary marker as a visual overlay of the graphic output.

15. The augmented reality memorial assembly according to claim 14, further comprising a funerary marker and a coded tag capable of decoding by the code reader.

16. The augmented reality memorial assembly according to claim 15, wherein the coded tag is affixed to the funerary marker or formed integrally with the funerary marker.

17. The augmented reality memorial assembly according to claim 14, wherein the spatial mapping module and the augmented reality engine include one or more discrete application software components.

18. The augmented reality memorial assembly according to claim 14, wherein the code reader and the visual receiver include an optical camera.

19. The augmented reality memorial assembly according to claim 14, wherein the visual receiver includes an optical camera and the code reader includes a radio frequency receiver.

20. The augmented reality memorial assembly according to claim 14, wherein the visualisation display includes a display screen or an in-built projector.

21. A funerary marker for an augmented reality commemoration of one or more deceased individuals, comprising:
  a coded tag encoding a Uniform Resource Identifier (URI), the URI being configured to identify a network location containing information for commemorating the one or more deceased individuals; and
  a visualisation display for displaying a graphic output including the information for commemorating the one or more deceased individuals in semantic context with the funerary marker as a visual overlay of the graphic output;
  the funerary marker further including an information system for augmented reality commemoration at a site of a funerary marker, comprising:
  one or more items of graphic digital content for commemorating at least one deceased individual, the one or more items of graphic digital content each being located at one or more unique network locations;
  one or more digital tag(s) encoding the network location(s);
  a spatial mapping module for mapping the position and geometry of the funerary marker wherein the spatial mapping module is configured to receive a visual representation of the funerary marker and to generate a spatial map including the position and geometry of the funerary marker, and wherein the spatial mapping module is configured to communicate the spatial map to an augmented reality engine;
  an augmented reality engine configured to receive a spatial map from the spatial mapping module and information of the type of display included in the system, and configured to adapting the one or more items of graphic digital content to align with the position and/or geometry of the funerary marker; and
  a display for displaying a graphic output including the adapted graphic digital content in semantic context with the funerary marker as a visual overlay of the graphic output.

22. The funerary marker according to claim 21, when used with a code reader, and further including a receiver in communication with a spatial mapping module and an augmented reality engine, to retrieve, process and display the information for commemorating the one or more deceased individuals in semantic context with the funerary marker.

23. The funerary marker according to claim 21, further including an augmented reality memorial assembly.

24. The funerary marker according to claim 21, wherein the receiver is located within a mobile device.

25. The funerary marker according to claim 21, wherein the spatial mapping module and the augmented reality engine include one or more discrete application software components.

26. The funerary marker according to claim 25, wherein the spatial mapping module and the augmented reality engine are located within a mobile device.

27. The funerary marker according to claim 21, wherein the visualisation display includes a projector display.

28. The funerary marker according to claim 21, wherein the visualisation display is located within a mobile device.

* * * * *